(No Model.)
W. & A. W. DUNN.
VAPOR CONDENSER FOR VACUUM PANS.
No. 604,607. Patented May 24, 1898.
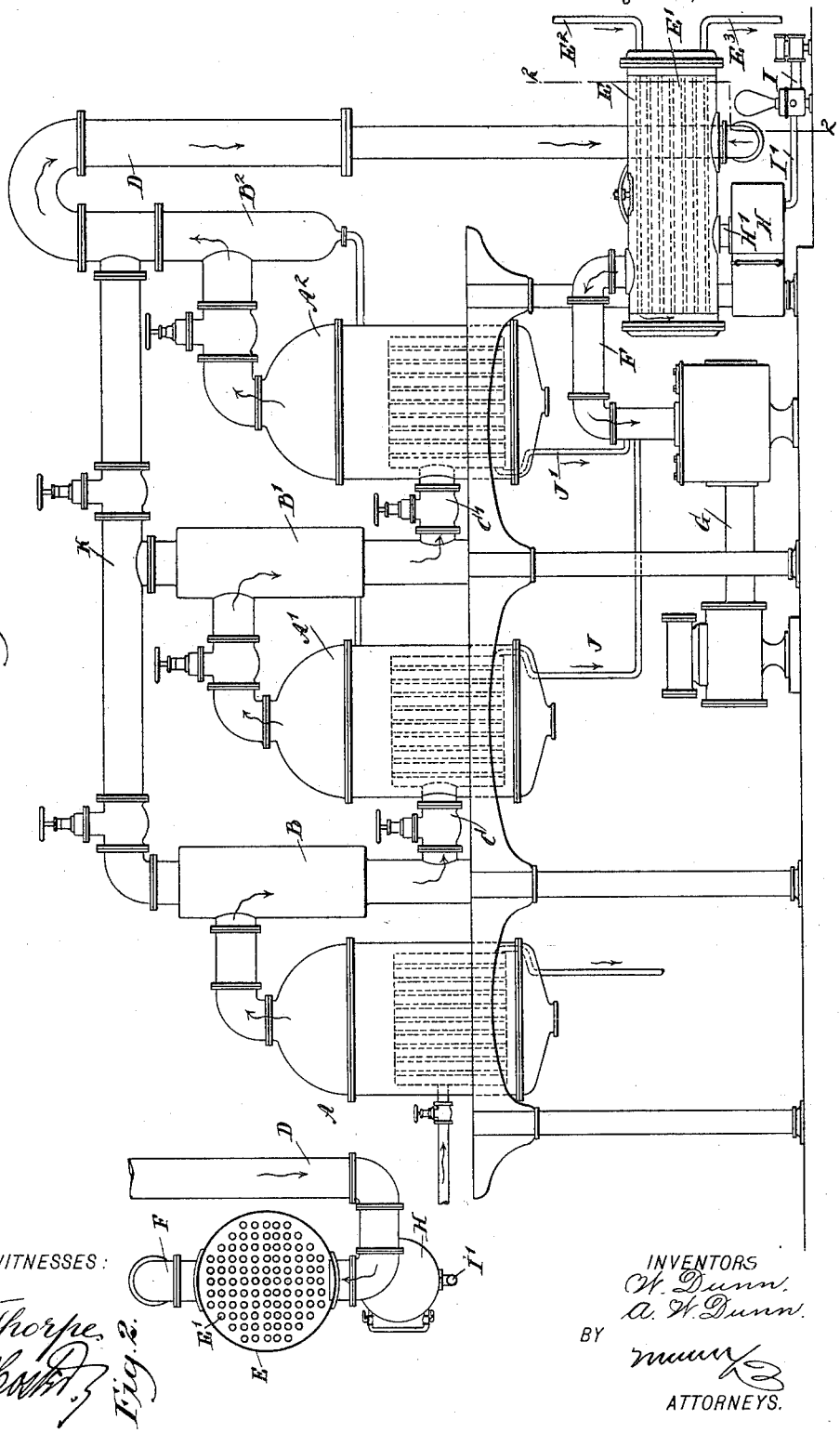
WITNESSES:
Edw. Thorpe
Geo. J. Hawk
INVENTORS
W. Dunn.
A. W. Dunn.
BY
ATTORNEYS.

UNITED STATES PATENT OFFICE.

WILLIAM DUNN AND ALFRED W. DUNN, OF HONOMU, HAWAII.

VAPOR-CONDENSER FOR VACUUM-PANS.

SPECIFICATION forming part of Letters Patent No. 604,607, dated May 24, 1898.

Application filed October 26, 1897. Serial No. 656,424. (No model.)

*To all whom it may concern:*

Be it known that we, WILLIAM DUNN and ALFRED W. DUNN, of Honomu, Hawaii, have invented a new and Improved Apparatus for Condensing Juice, of which the following is a full, clear, and exact description.

The invention relates to the manufacture of sugar by the vacuum process; and its object is to provide a new and improved apparatus for condensing the vapors and small particles of sugar without loss and without the employment of baffle-plates, entrainment-traps, and like devices now employed for the purpose.

The apparatus consists in a certain arrangement of parts, which will be fully described hereinafter and defined in the claim.

Reference is to be had to the accompanying drawings, forming a part of this specification, in which similar characters of reference indicate corresponding parts in both the figures.

Figure 1 is a side elevation of the apparatus, and Fig. 2 is a transverse section of the same on the line 2 2 of Fig. 1.

The apparatus illustrated in Fig. 1 is provided with a number of effects or vacuum-pans A A' A², having separators B B' B², respectively, of which the separator B is connected at its lower end by a valved pipe C with the pan A', and the separator B' is connected by a similarly-valved pipe C' with the pan A², and the separator B² is connected by a pipe D with the lower side of a surface condenser E, containing a coil of pipe E', connected at one end with a water-supply pipe E² and at its other end with a water-discharge pipe E³ for carrying off the water of condensation after it has passed through the coil of pipe in the condenser. The condenser E is connected by a pipe F with a vacuum-pump G, of any approved construction, so that the vapors and particles of sugar are drawn from the vacuum-pans through the pipe B and into and through the condenser E and around the coil of pipe E', through which circulates the condensing water. Thus by the arrangement described the condensing of the vapors and particles of sugar takes place separately from the water used for condensation, so that the vapors and water do not come in contact with each other, and consequently no vapors and particles of sugar are taken up by the water of condensation and lost, as is the case with apparatus now used for the purpose.

The bottom of the condenser E is connected by a neck H' with a container or reservoir H for receiving the condensed juice, and the bottom of this container is connected by a pipe I' with a pump I for pumping the juice accumulating in the condenser to a tank or other receptacle for further treatment.

The drums of the pans A' A² connect by pipes J J' with the pipe F, so that the discharge from the said drums passes through the vacuum-pump G with the vapors.

The pipe D is connected by a valved pipe K with the separators B B' of the first and second vacuum-pans, so that either of the said pans can be directly connected with the pipe D whenever it is desired to do so.

The liquor passing from the condenser E into the container H stands about 6° or 7° Baumé below the liquor—that is, in the last pan of effect A²—and this liquor is well worth saving, especially in large refineries making from fifty to one hundred tons of sugar per day.

The condenser E is provided with a manhole to permit of readily cleaning the coil of pipe E' in case of formation of scale.

Having thus fully described our invention, we claim as new and desire to secure by Letters Patent—

In apparatus for condensing juices, the combination of a vacuum-pan, a pipe leading from the vacuum-pan downwardly, a surface condenser located beneath the vacuum-pan and having said pipe in communication with the bottom of the surface condenser, a pump located adjacent to the surface condenser and in communication therewith by means of a pipe running from the top of the surface condenser, a reservoir beneath the surface condenser and communicating with the bottom thereof, and a second pump, said second pump having communication with the reservoir.

WILLIAM DUNN.
ALFRED W. DUNN.

Witnesses:
W. WILSON WRIGHT,
THEOD. H. BOEHME.